Sept. 2, 1969 W. F. LIBBY 3,465,153
RADIATION PROTECTION SYSTEM AND APPARATUS
Filed Aug. 14, 1964 2 Sheets-Sheet 1
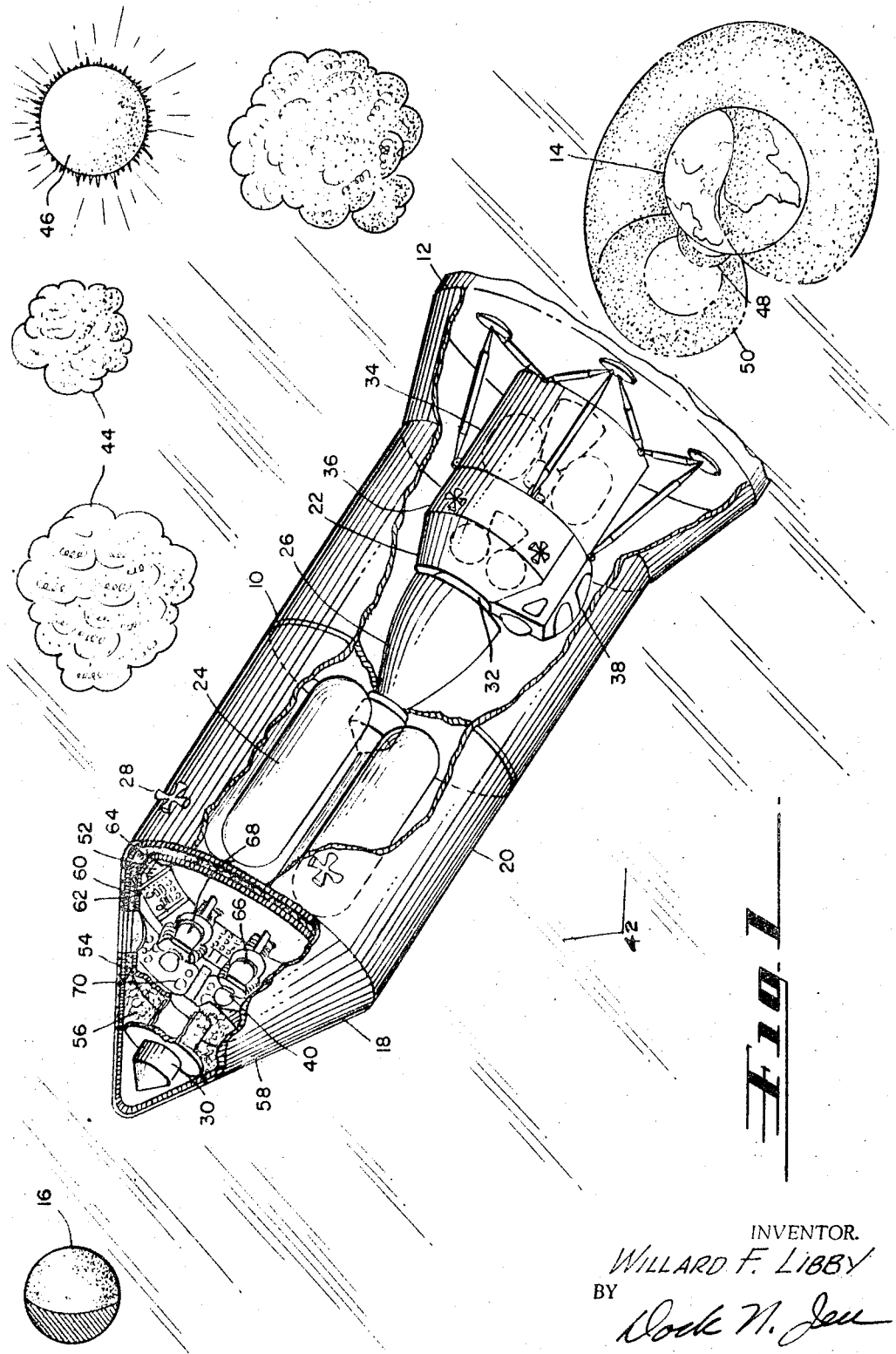
INVENTOR.
WILLARD F. LIBBY
BY
AGENT Sept. 2, 1969  W. F. LIBBY  3,465,153
RADIATION PROTECTION SYSTEM AND APPARATUS
Filed Aug. 14, 1964  2 Sheets-Sheet 2
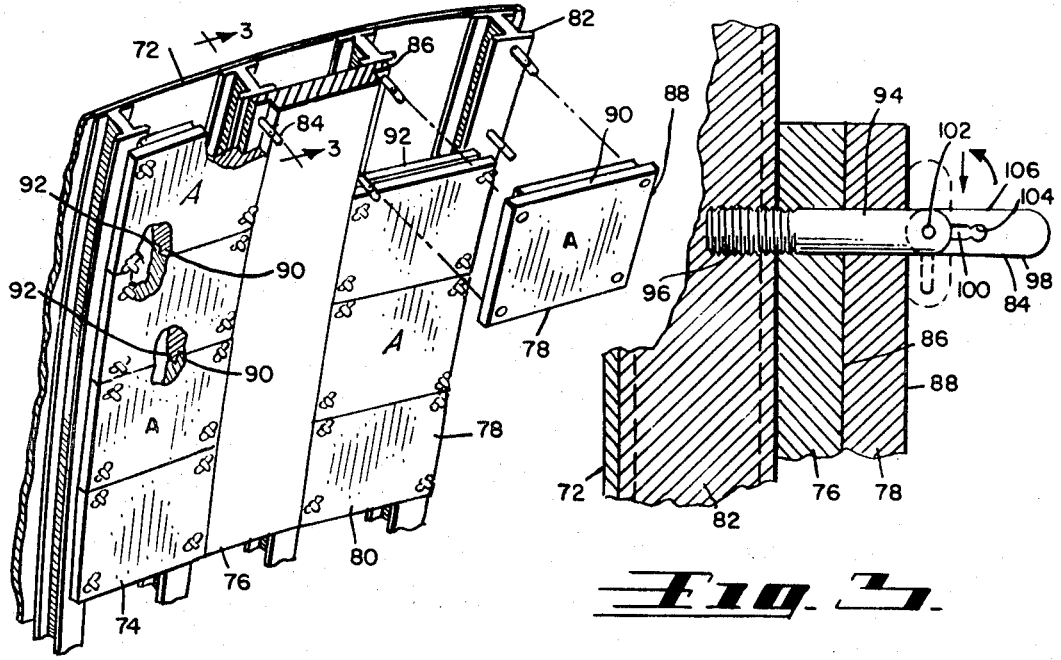
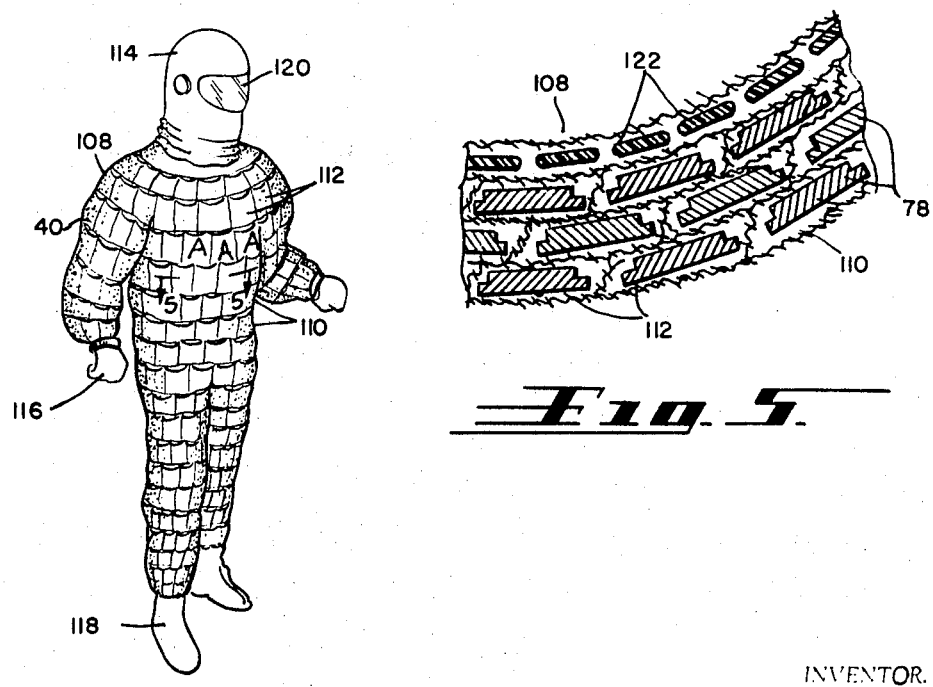
INVENTOR.
WILLARD F. LIBBY
BY
Dock N. Jen
AGENT United States Patent Office 3,465,153
Patented Sept. 2, 1969

3,465,153
RADIATION PROTECTION SYSTEM AND
APPARATUS
Willard F. Libby, Los Angeles, Calif., assignor to
McDonnell Douglas Corporation, Santa Monica,
Calif., a corporation of Maryland
Filed Aug. 14, 1964, Ser. No. 389,734
Int. Cl. G21f 1/12, 3/02, 7/00
U.S. Cl. 250—108                                    16 Claims My present invention relates generally to astronautics, the science of space flight, and more particularly to a system and apparatus and method for the protection of astronauts from the hazards of suddenly encountered radiation fields of extreme intensity in space.

Manned space flights have now been successfully achieved by both the United States and the Soviet Union. Such flights will be followed by manned space probes including lunar and interplanetary missions for the manned exploration of the Moon, Mars and Venus. The manned space program of the United States is directed towards manned exploration first of the moon and then initially only of the two planets Mars and Venus of the solar system since all of its other planets appear to be barren and lifeless. These and other probes will, of course, eventually lead to interstellar journeys over vast distances to other stellar systems for the purpose of conducting explorations aimed at discovering new worlds which are susceptible to colonization by the human race.

The propulsion systems required for the various stages of a multistage vehicle system must be able to provide great amounts of energy on extended manned flights such as in the lunar and interplanetary missions for the manned exploration of the moon, Mars and Venus. Extremely high energy requirements will be imposed on the propulsion systems in launching, landing and returning a manned spacecraft on these missions. The attainable propulsion systems based upon current concepts and design techniques, including use of conventional high energy propellants, severely limit the payload capability of any resulting vehicle system which is to be used in manned, long range space missions.

Much of the energy required and expended by the propulsion systems of a multistage vehicle system is used to achieve escape velocity for the payload which includes a manned spacecraft and its own return launch system. Since the amount of payload which can be carried to escape velocity is a function of the initial thrust level available in current concepts of booster vehicle systems, and thrust is a function of initial launch weight, both size and weight of a vehicle system that could bring the manned spacecraft to escape velocity, will be extremely large in order to provide the necessary thrust levels to accomplish this. Thus, the Nova vehicle which is designed to achieve a manned lunar landing is a huge, three stage booster system having a payload capability that would successfully permit a manned lunar landing of a suitable spacecraft and its subsequent return to earth.

It will be apparent that the concomitant increase in size and weight of the vehicle system with the further increase in thrust levels required to achieve the necessary payload capability which would permit the other manned, long range space probes, soon becomes prohibitive. It is, therefore, desirable that until vastly superior propulsion systems and propellants are developed, the required increase in size and weight of the vehicle system be held to a minimum and the useful payload be maximized as much as possible. A greater payload can, of course, be brought to escape velocity by increasing the number of stages of the vehicle system, or increasing the propellant-weight ratio thereof. However, the advantages gained by using a greater number of stages are offset by the additional complexity involved, and it is very difficult to increase the propellant-weight ratio much beyond a certain value in the present concepts of vehicle systems.

The only feasible alternative remaining is to reduce the inert weight which is not useful for propulsion in the vehicle system so that a greater payload weight can be obtained without the need to increase initial launch weight of the vehicle system. This is an important consideration since any unnecessary inert weight in the various stages of the vehicle system imposes a heavy, additional demand on required engine thrust which is functionally related to launch weight. In a large, three stage booster system to be used on a lunar flight, for example, any change in weight of the final stage will be reflected in a similar change in the total launch weight multiplied, however, by a growth factor which may easily number in the hundreds.

In undertaking manned, space exploration missions, the astronauts may be exposed to radiation fields of high intensity in space. Biological damage is done by the ionization produced by radiation and high energy charged particles which pass through the tissues of the astronauts. A lethal action arises when the radiation dosage is excessive such that changes in living cells result in their death when they attempt division. Of course, extremely high radiation dose rates which may be lethal to an astronaut after a relatively short exposure period are not expected to be encountered except rarely in ordinary space flights.

Still, the radiation hazard in space is substantial, and considerable dangers exist from the pervasive cosmic radiation of outer space and/or moving clouds of ionized gas; i.e., charged particle concentrations of the solar plasma stream formed by the sun, especially during a flare. Some of these charged particles may, for example, be trapped in the magnetosphere which is the radiation area about the earth extending from about 400 to 48,000 miles out into space. The inner and outer bands of the magnetosphere are, of course, the well-known Van Allen belts of intense, trapped corpuscular radiation. The inner portion of the magnetosphere consists mostly of high energy protons, the outer portion largely of soft electrons, and the intermediate portion is filled with less energetic particles. If an earth orbit is established from which escape is initiated on an interplanetary transfer path, orbits that avoid the inner portion of the magnetosphere should be used so that the orbiting astronauts will not be subjected to prolonged exposure to high energy particles.

Astronauts traveling on an extended space mission inside a spacecraft may be regularly exposed to radiation at dose rates which may have adverse effects on the travelers, and such radiation cannot be ignored for any substantial length of time. The astronauts can be protected from radiation injury by strict observation of an accepted tolerance level of radiation to which they may be exposed. In determining this tolerance level, consideration must be given to the nature of the radiation to which the astronauts may be exposed since radiation damage is dependent not only on the amount of ionization produced, but also on the density of ionization or specific ionization produced along the paths of the ionizing radiation. The lethal or harmful action of ionizing radiation generally increases in biological effectiveness with specific ionization along the tracks of the ionizing particles. The actual ionization dosage, therefore, must be increased with increasing ionization density in order to obtain the effective dosage. It is generally known, for example, that beta rays, gamma rays, neutron radiation and alpha rays produce very similar physiological effects; however, their specific ionization and hence biological effectiveness increases progressively in the order mentioned.

Primary cosmic radiation includes a mixture of nuclei of hydrogen (protons) up to iron, and other indefinitely identified heavier nuclei. Such primary or incident cosmic radiation appear to consist largely of positively charged particles rather than high energy gamma radiation, although significant amounts of the latter may be associatively produced. The various different species of nuclei constituting the cosmic ray flux of particles are apparently present roughly in proportion to their abundance in nature. These ionizing particles from outer space have energies as great as 10 billion electron volts to a million billion electron volts, and have extremely great effective penetrability.

When a primary cosmic ray particle enters matter such as the skin of a spacecraft, the air and/or the bodies of the astronauts therein, its great kinetic energy is given up to produce secondary charged particles. The kinetic energy of a particle may be either given up gradually by ionizing and exciting the atoms of the material through which it passes, or it may collide with an atomic nucleus to produce a violent nuclear reaction. Generally, the primary particle yields part of its energy in ionization and then eventually transfers much of its remaining energy to various types of secondary particles resulting from a nuclear collision.

Following such a nuclear collision, fragments of the primary particle may continue along its original path with approximately the velocity of the original nucleus. These fragments may be accompanied by knock-on or shower particles including neutrons and protons, and created particles which are mainly pi-mesons. The remnant of the target nucleus is highly excited and produces so-called evaporation, medium and low energy charged particles including alpha particles and protons with possibly some deuterons and tritons.

The neutrons may eventually collide with other nuclei and the protons, and produce further evaporation particles. The pi-mesons may be positively or negatively charged, or neutral. The positive pi-meson decays into a positive mu-meson and the negative pi-meson may decay into a negative mu-meson or may be captured by a nucleus with further resultant collision effects. The extremely penetrating positive and negative mu-mesons then disintegrate to form a positron and electron, respectively. The neutral pi-meson dissociates almost immediately into two high energy gamma rays or photons which produce secondary, ionizing electrons and positrons.

While the normal steel skin structure of the spacecraft would produce some reduction primary particles, this could be offset by the increase in secondary particles resulting from the nuclear collisions of the primary particles with the nuclei of the skin material and the air inside of the spacecraft. It is, of course, well-known that, mass for mass, air is a better stopper of primary charged particles than iron or steel. Assuming, however, that there is no great increase or build-up in secondary particles very far beyond the inner surface of the usual skin structure, and additional thickness of about 50 cm.-gm./cc. of shielding of a light material such as water or a plastic (as determined from suitable tables of the mean free paths of various types of primary particles in different materials) is still needed to produce a relatively large, practical reduction of the primary and secondary radiation particles.

Thus, the effective dose rate for astronauts within a spacecraft can be reduced to the accepted tolerance level if an inner shield, equivalent to a thickness of 50 cm. of water, is provided about the inner surface of the skin structure of the spacecraft. Obviously, the addition of this amount of inert weight to the spacecraft would impose a greatly increased energy demand on required engine thrust and, of course, this will be reflected in a tremendous growth in total launch weight of the vehicle system.

The strong flux of charge particles formed by the sun, when produced during a solar flare, can become an even more serious problem than any resulting from the pervasive cosmic radiation of space. A vastly increased stream of charged particles is emitted from the sun during the flare period and these charged particles sometimes have extremely high energies which are equal to those of primary cosmic radiation. When a spacecraft without an excessively impractical amount of shielding on it is subjected to such a strong flux of highly energetic charged particles, an unavoidable condition of emergency will develop for the astronauts within the spacecraft.

Generally, the harmful effectiveness of a given radiation dosage decreases as the rate of exposure decreases, and a particular dosage accumulated in several fractions is less effective than if such a dosage is delivered at one time. Further, the response to radiation depends upon the portion of the organism which is exposed to radiation. For example, irradiation of the abdomen is harmfully more efficient than irradiation of the thorax. Shielding of certain relatively small portions of the body such as the spleen, head and extremities can reduce the harmful effects and mortality resulting from over exposure of the whole body to radiation. Also, penetrating radiations are more effective than superficial radiations in producing acute toxicity in the person.

When an astronaut is exposed to any ionizing radiation, it is well-known that the blood forming tissues are very likely to be injured since such tissues are among the most sensitive to ionizing radiation. Such tissues must, therefore, be particularly protected from ionizing radiation and, if excessively exposed, measures which promote recovery of the blood forming tissues and prevent bacteremia should be taken. The lymphatic organs and tissues are extremely radiation sensitive, and the head and limbs also contain highly susceptible reticular tissue. Shielding of the spleen of small animals exposed to a high dosage of total body radiation have been found experimentally to result in survival of over 75 percent whereas less than 1 percent survive without such shielding. Thus, shielding provided for the spleen, gastrointestinal tract, head and limbs will greatly enhance recovery and increase the likelihood of survival.

In view of the nature of the high energy charged particles which are encountered in space, it appears that some form of shielding must be provided on spacecraft if prolonged exposure is expected as in the cases of the manned lunar, Mars and Venus exploration missions planned. To provide adequate shielding for the astronauts inside the spacecraft from, for example, the heavier cosmic ray particles, more than the normal skin structure of the spacecraft may be required. Of course, such shielding may not provide adequate protection for anything more than very brief exposures through intense radiation fields such as the Van Allen belts or to the strong flux of charged particles resulting from a solar flare, for example.

Bearing in mind the foregoing discussion, it is a major object of my invention to provide a highly effective radiation protection system and apparatus for spacecraft and astronauts, that will not increase the total launch weight of its vehicle system to any significant extent but which provides necessary and safe protection of the astronauts from exposure to excessive radiation due to the pervasive cosmic radiation and/or suddenly encountered radiation fields of extreme intensity in space.

Another object of this invention is to provide shielding which is readily available in substantial amounts to astronauts in a spacecraft when exposed to sudden and intense radiation in space.

A further object of this invention is to provide a radiation protection system for astronauts in a spacecraft wherein the astronauts will be fully protected from the higher radiation dose rate normally encountered in space but will not be encumbered in activities of any kind within the spacecraft.

A still further object of the invention is to provide shielding which is available in variable amounts as may be required for protection of astronauts in a spacecraft that has a minimum of inert structure and weight.

Briefly, and in general terms, the foregoing and other objects are preferably accomplished by providing a launch vehicle including a spacecraft which is constructed to facilitate partial dismantling of internal structural members to use as shielding. The detachable parts of the spacecraft structure are adapted to be easily carried in special garments worn by the astronauts or fastened directly to the space suits of the astronauts around the most vital parts of the body, such as the spleen, to shield such parts against radiation fields of extreme intensity suddenly encountered in space.

These detachable parts normally provide the necessary strength to their respectively associated internal structural members as required during vehicle launching, for example, and which structural members need not be as strong during free flight. Thus, the use of such detachable parts of internal spacecraft structural members for shielding purposes will not incur any substantial increase in total mass of the vehicle as launched since the detachable parts have useful and necessary functions under normal conditions, but which functions can be given up without penalty in periods of emergency.

Certain portions of the internal structural members of the spacecraft can, for example, comprise relatively small metal plates which can be detached by removal of screws or operation of other attachment means, and placed in pockets of the special garment worn by each astronaut or fastened to a space suit with any suitable fastener means. Under the weightless condition of space, each individual can handle as much as one foot (equivalent) of lead shielding around the vital parts of his body without difficulty. This means that adequate shielding is obtainable to provide protection against radiation fields of different intensities, and which might be encountered during a space flight.

Normal shielding protection against the pervasive cosmic radiation in space can be provided to some extent by the usual skin structure of the spacecraft. In areas where there is little intervening skin structure or other buffer matter such as a filled water storage or fuel tank, for example, it may be necessary to provide appropriate shielding at such location. Added shielding can be provided by fabricating the detachable metal plates or certain ones of them of lead, for example, and these plates can be distributed in a matrix about the spacecraft to block or obstruct a significant amount of incident radiation. To supplement the usual spacecraft skin structure and/or added shielding, a magnetic field similar to that of the earth may be produced about the spacecraft such that the weakest points (poles) of the magnetic field are located before the areas having the greatest amount of shielding matter, and the strongest part (equator) or the magnetic field is located before the areas having a relatively small amount of shielding matter for proper protection of the spacecraft and its occupants.

The strength of the magnetic field is made strong enough to deflect most of the charged, cosmic ray particles from the less shielded areas of the spacecraft. This will provide further protection of the astronauts from extended exposure to the high radiation dose rate due to the pervasive cosmic radiation found in space. When, however, extremely intense radiation fields are suddenly encountered wherein the charged particles have energies which can penetrate the protective magnetic field and spacecraft skin structure or produce dangerous secondary particles from the latter and the air in the spacecraft, it will be necessary for the astronauts to remove the detachable metal plates from the internal structural members of the spacecraft and place them in the special garments and donned by the astronauts, or fasten them directly to their space suits in sufficient amounts around the vital parts of their bodies until the emergency is past.

My invention will be more fully understood, and other features and advantages thereof will become apparent, from the following detailed description of an illustrative example of the invention to be taken in conjunction with the accompanying drawings, in which:

FIGURE 1 is a perspective view of a manned spacecraft, incorporating a radiation protection system and apparatus according to my invention, which has been boosted to escape velocity and into an interplanetary transfer path to, for example, Mars;

FIGURE 2 is a fragmentary, perspective view of a section of the inner skin structure of a spacecraft wherein small metal plates can be detached from the skin structure and used as shielding around the vital parts of an astronaut during an emergency;

FIGURE 3 is a fragmentary sectional view of a part of the internal skin structure as taken along the line 3—3 indicated in FIGURE 2;

FIGURE 4 is a somewhat diagrammatic, perspective view of a garment which can accommodate a large number of shielding plates in variable thicknesses at any desired position about the body of a wearer of the garment; and FIGURE 5 is a fragmentary sectional view of the garment as taken along the line 5—5 indicated in FIGURE 4.

FIGURE 1 shows a spacecraft 10 which has been injected by a final booster stage 12 into an interplanetary transfer path from the earth 14 towards, for example, the planet Mars 16. The spacecraft 10 includes a command module 18 and its service module 20, and a two-stage excursion module 22. The service module 20 carries fuel tanks 24 and other auxiliary equipment within it. Mounted to the service module 20 are rocket engine 26 and attitude control jets 28. At an appropriate time after injection, the command module 18 with its service module 20 are jointly separated from the excursion module 22 and rotated 180 degrees so that the airlocks 30 and 32 of the command module 18 and the excursion module 22 may be joined together. The booster stage 12 is subsequently separated from the spacecraft 10 and permitted to burn up on re-entry into the Earth's atmosphere.

Upon reaching Mars 16 and achieving a circular orbit around it, part of the crew will enter the excursion module 22 through the airlocks 30 and 32. The excursion module 22 includes a lower landing stage 34 and an upper take-off stage 36. The landing stage 34 provides landing control of the excursion module 22, and is used to brake its descent to a soft landing on the surface of Mars 16. The landing stage 34 may be completely emptied of fuel after landing and used as a launching platform for the take-off stage 36 which includes a suitable space cabin 38 to accommodate the crew members transferred thereto.

After launch of the take-off stage 36 from Mars 16 and subsequent rendezvous with the command module 18, the crew members in the space cabin 38 are transferred back to the command module 18. The take-off stage 36 is then left in orbit about Mars 16 and the rocket engine 26 started to inject the command module 18 with its service module 20 into a correct transfer path from Mars 16 towards Earth 14. The service module 20 is separated from the command module 18 after achieving an orbit about the earth 14 prior to re-entry and landing at a preselected site.

The Earth is approximately 93 million miles from the sun and Mars has a mean distance from the sun of approximately 141.5 million miles. Since very high transfer velocities would be required for minimum time flights to Mars, and the fuel requirements for such journeys would be multiplied by very large factors over that needed for minimum energy flights, minimum energy interplanetary paths must be generally used for some time to come until greatly advanced propulsion systems become available. For a minimum energy flight to Mars, Earth and the target planet Mars must be in the proper positions before the space vehicle is launched. If launched on a proper date, the journey to Mars will last on the order of 244 days. After a suitable exploratory and waiting period on Mars to enable Earth to get into the proper positions, the return trip to Earth can then be commenced.

It is apparent that the astronauts 40 carried in the spacecraft 10 will be exposed to the higher radiation of space at a dose rate which is dangerous over the extended period of time incurred by the long flight to and from Mars 16. Even when reasonably advanced propulsion systems become available to provide, for example, a constant acceleration of 0.1 g. on the spacecraft 10 to midpoint followed by appropriate deceleration, total flight time to and from Mars 16 would still require nearly a year. Thus, for a considerable length of time to come, astronauts undertaking interplanetary and other extended flights in space may be subjected to excessive exposures due to cosmic radiation 42 and encounters with the solar clouds 44 of ionized gas, corpuscular radiation). The cosmic radiation 42 and solar clouds 44 are, of course, schematically indicated in FIGURE 1.

More seriously, when a solar flare develops, a vastly increased stream of highly energetic charged particles is emitted from the sun 46 at the time of the flare and will approach the Earth 14 and spacecraft 10 some time later. The charged particles emitted during a flare sometimes have extremely high energies which are equal to those of primary cosmic radiation. Many of the charged particles will be trapped in and between the Van Allen belts 48 and 50 indicated in a cross sectional view, some weaker ones will be deflected by the Earth's magnetic field, and some of the stronger ones will penetrate the magnetic field and be stopped by the Earth's atmosphere to produce secondary radiation as characterized by severe magnetic storms acompanied by large displays of aurora. The spacecraft 10, however, does not have the benefit of a sufficiently large magnetic field or a surrounding atmosphere to protect it and is, therefore, subjected to a strong flux of highly energetic charged particles. Under there circumstances, a condition of emergency develops for the astronauts 40 in the spacecraft 10.

The command module 18 has an inner cabin 52 which can be formed from welded, lightweight panels 54 having spaced metallic faces. The cabin 52 walls are suitably insulated and cushioned by radiation resistance sponge material 56 from an outer shell 58 which is preferably formed from honeycomb panels made entirely of stainless steel material. In addition, ablative material can be provided as a coating 60 on the outer shell 58. The ablative material encases an electrically conductive winding 62 which is wound about the outer steel face of the shell 58 to reinforce the same structurally, as indicated in FIGURE 1. The winding 62 is, of course, suitably insulated from shell 58, and is adapted to be connected to a power source 64 and energized thereby to produce a protective magnetic field about the command module 18. Other well-known means such as appropriately located and energized dipole elements for producing a suitable magnetic field can, of course, be used. Spin of the spacecraft 10 about its longitudinal axis can be produced by means of the jets 28. Viewing ports such as suitable windows are provided at selected points about the command module 18 and may have suitable protective covers therefor.

The internal construction of the command module 18 is generally conventional and includes universally mounted contour chairs 66 which have adjustable head rests 68, instruments including a conventional radiation measuring and alarm device 70, and various other normal equipment which are not shown. Certain, selected, internal structural members in the command module 18 are specially constructed, however, to include elements which can be made of radiation resistant material in a readily detachable and useful form to serve a dual purpose in accordance with my invention. The term "element" as used herein is also understood to include cut pieces in any desired form from any fixed structure.

FIGURE 2 shows a specially constructed portion of the inner skin structure 72 of cabin 52 of the command module 18. The illustrated construction is, of course, only one example of a suitable design wherein a normal structure of a spacecraft can be made to serve dual functions. Inner wall 74 of the skin structure 72 has, for example, fixed metallic vertical panels, such as the ordinary steel panel 76, which are separated by a number of detachable metallic plates 78 that are normally assembled and secured to form a bridging vertical panel 80 ordinarily between two successive fixed vertical panels 76. The fixed panels 76 are suitably secured to respective pairs of upright beams 82, and attachment means 84 are installed in proper positions to the beams 82 and the fixed panels 76 as shown in FIGURE 2 to mount the plates 78.

The plates 78 can be made of ordinary, internal structural member metal or can be fabricated from lead, for example, or of any radiation resistant material that can be made into a reasonably strong piece of structure. Because of the heaviness of lead, only certain of the plates 78 could be made of lead and these particular lead plates can be suitably identified as by the letter A as indicated in FIGURE 2. The other plates 78 can be made of steel or other materials. Any appropriate indicia including shape or color identification may be used, of course. Also, it is to be understood that the plates 78 may be made in any desired size, shape or curvature to facilitate their ultimate attachment to the body of an astronaut.

The plates 78 fabricated from lead and/or other radiation resistant material can further be carefully distributed about the cabin 52 to form a shielding matrix or grid which will block or obstruct a significant amount of the charged particles that might penetrate into the command module 18 to the inner cabin 52, so as to maintain a safe radiation level therein under normal conditions. However, under conditions of emergency, the relatively finely distributed elements of the shielding matrix are drawn together and concentrated around the most vital parts of the body so that a sufficient amount or thickness of shielding can be obtained to be effective against any suddenly encountered radiation of extreme intensity. A given total amount of radiation resistant material is dispersed in a pattern which will effectively obstruct a maximum amount of the penetrating radiation in order to protect the astronauts as much as possible under all conditions. If all of the detachable plates 78 were made of a radiation resistant material for inner wall 74, then the matrix pattern for the cabin 52 would be a truncated cone formed of vertical strips of the radiation resistant material. Illustratively, the size of the plates 78 may be about the size of a regular playing card of any reasonable thickness to yield the necessary structural strength, for the command module 18.

The sides of the fixed vertical panels 76 have shoulders 86 on which vertically extending side ledges 88 of all the detachable plates 78 rest. As can be seen in FIGURE 2, the normally horizontal side ledges 90 of the detachable plates labeled A overlap the corresponding ledges 92 of the intervening unlabeled plates 78. This construction, of course, permits removal of the lead plates 78 which are labeled A first before the intervening unlabeled plates 78 can be removed, by operation of the attachment means 84.

FIGURE 3 is a fragmentary sectional view of the skin structure 72 as taken along the line 3—3 indicated in FIGURE 2. The attachment means 84 is generally conventional and comprises a stud 94 which is threaded into a tapped hole 96 in the shoulder 86 of the fixed panel 76 and upright beam 82. The stud 94 has an extension slide 98 with a slot 100 therein which engages a pin 102 connecting the slide 98 to the stud 94.

After a plate 78 has been placed onto the stud 94 as shown in FIGURE 3, the slide 98 is rotated upwards and pushed downwardly until a detent 104 portion of the slot 100 engages the pin 102. The sides 106 of the slide 98 can be slightly tapered such that a wedging action is also obtained to secure the plate 78 firmly against the shoulder 86 as the slide 98 is being pushed downwardly. By reversing the operation of the attachment means, the plate 78 can be easily and quickly removed for use. Other attachment means such as screws, springing button fasteners, etc. can, of course, be used.

FIGURE 4 shows an astronaut 40 who has donned a garment 108 which is adapted to receive and hold the plates 78. The garment 108 is essentially an expandable piece of clothing having rows of multiple layered flap pockets 110 arranged in successively overlapping rows much in the form of loose louvers. Each of the flap pockets 110 is divided into compartments 112 and certain of these are labeled with the same indicia as on corresponding plates 78. For example, the compartments 112 which would protect the very important spleen of the astronaut 40 are labeled with the letter A corresponding to that on certain of the plates 78 shown in FIGURE 2. Thus, the lead plates 78 labeled A are the ones which can be removed first and can be placed first into the correspondingly labeled compartments 112 of the garment 108 shown in FIGURE 4. If the shape of certain of the plates 78 constitutes the indicia, corresponding compartments 112 and, if necessary, the pockets 110 themselves can be shaped to match.

Other compartments 112 of the garment 108 can be labeled with other indicia such as the letters B, C, D, etc. to indicate an order in which other correspondingly labeled plates 78 are to be placed into such compartments 112. Of course, if none of the plates 78 are labeled with any kind of indicia, and the compartments 112 are labeled with indicia having a descending order of importance, the compartments 112 should be filled in such descending order as far as possible with the available number of plates 78. Since the flap pockets 110 each has multiple layers of compartments 112, the number of layers of any particular area, such as that of the compartments 112 labeled A in FIGURE 4, that should be filled will depend upon the intensity (rate of transfer of energy across unit areas, or particle energy and count rate across unit areas) of the measured radiation as indicated by the radiation measuring and alarm device 70 shown in FIGURE 1.

A suitable chart (not shown) can be provided with the device 70 to list, for example, the amount of shielding or layers of the plates 78 which is required for various levels of radiation first for the important spleen area and then for the other critical areas of the body in successive order of importance. Thus, for a certain level of measured radiation, the chart may designate that two layers of lead plates 78 labeled with the letter A would be adequate for the spleen area. Any remaining lead plates 78 labeled with the letter A can then be used in the compartments 112 which may be labeled with the letter B next, and so continuing on until the lead plates 78 with the letter A thereon are exhausted. Plates 78 with the letter B can then be used to fill the compartments 112 are required. The chart should, of course, conveniently indicate the equivalence in shielding effectiveness between the different types of plates 78 that are available.

The helmet 114, gloves 116 and boots 118 of the astronaut 40 can be made of radiation resistant material of required characteristics and can be worn during periods of emergency. The glass visor 120 of the helmet 114 is, of course, made of glass having radiation resistant properties. The shielding effectiveness of these items should be such that they provide adequate protection during all expected periods of emergency due to unusually intense radiation. If further shielding is found necessary, hoods can be fabricated from the radiation resistant sponge material 56 indicated in FIGURE 1, to provide flexible coverings which would fit around the highly contoured items and parts.

FIGURE 5 is a fragmentary sectional view of the expandable garment 108 as taken along the line 5—5 indicated in FIGURE 4. The garment 108 has lightweight boning 122 which can be made of radiation resistant material and serves as an inner protective foundation for the astronaut 40. The multiple layered flap pockets 110 can be made of an elastic fabric such as Lastex and divided into compartments 112, or can be made of ordinary fabric and divided into compartments 112 which have elastic openings and some elastic seams for gripping and holding a plate 78 in such a compartment 112. Adjacent layers of compartments 112 in a pocket 110 are preferably laterally offset so that the plates 78 are held in a staggered relationship between different layers. The gaps between plates 78 are thus blocked by the plates 78 in an adjacent layer. A better contour arrangement is also obtained in this manner, and complete shielding is obtained with the overlapping rows of pockets 110. The spleen area as indicated by the compartments 112 labeled A in FIGURE 4 and other critical areas should be each designated by a sufficiently large area to assure that it will be fully covered by the proper number of layers of shielding material, of course.

The plates 78 can be secured to the garment 108 or directly to a space suit by other means than in elastically biased compartments, of course. Snap fasteners could be used with suitably adapted plates 78, or appropriately placed magnets attached to the garment 108 or space suit can be used, or cords can be used through small, previously emplaced holes in the metal plates 78 to tie the plates 78 to the garment 108 or space suit. While these fastener means can be used without the need of the garment 108 or pockets 110, the use of garment 108 with its multiple layered, overlapping pockets 110 with appropriate indicia on the compartments 112 greatly facilitates the proper and correct positioning and attachment of the plates 78 at critical areas of the body of an astronaut to protect him during periods of emergency from dangerously intense radiation encountered in space. If the plates 78 were made larger, or more were used, they can be detached and arranged into a matrix which provides adequate shielding or which supplements any shielding around a small, emergency control enclosure.

From the foregoing description it will be apparent that there is thus provided a system and apparatus of the character described possessing the particular features of advantage before enumerated as desirable, but which is obviously susceptible of modification in its form, proportions, detail construction and arrangement of parts without departing from the principles involved or sacrificing any of its advantages.

While in order to comply with the statute, the invention has been described in language more or less specific as to structural features, it is to be understood that my invention is not limited to the specific features shown, but that the means and construction herein disclosed comprise an illustrative example of several modes of putting the invention into effect, and the invention is, therefore, claimed in any of its forms or modifications within the legitimate and valid scope of the appended claims.

I claim:
1. A method for protecting an object and predetermined parts of the object from excessive exposure to radiation, which comprises:

housing and regularly shielding the object in a structure including structural elements which are normally integral with said structure and can be used as shielding;

determining any development of excessive environmental radiation intensity from a radiation sensing device for indicating development of excessive radiation intensity in said structure; and removing selected ones of said elements from said structure on such determination and forming in accordance with the indication of said sensing device, a matrix wherein the selected ones of said elements are positioned in proximity to at least the predetermined parts of the object in an adequate amount and thickness to protect the same from deleterious effects caused by excessive exposure to radiation.

2. The invention as defined in claim 1 in which indicia means is provided for at least certain of the selected ones of said elements, and including relating said elements provided with said indicia means to the predetermined parts of the object in a manner based upon the radiation intensity indicated by said sensing device for facilitating rapid and accurate formation of said matrix.

3. The invention as defined in claim 1 including positioning and securing in said matrix, the selected ones of said elements in proximity to the predetermined parts of the object normally for a limited time in positioning and securing means to form said matrix.

4. The invention as defined in claim 3 in which said positioning and securing means includes a garment adapted to fit at least a certain portion of the object, and having means for receiving and securing the selected ones of said elements to certain positions of said garment.

5. The invention as defined in claim 4 in which said garment has a plurality of pockets provided at various areas thereof for receiving and securing the selected ones of said elements respectively in said pockets normally for a limited time.

6. The invention as defined in claim 5 in which indicia means is provided for at least certain of the selected ones of said elements and corresponding indicia means is provided for certain of said pockets of said garment, and including relating the certain selected ones of said elements readily thereby to said pockets provided with corresponding indicia means for facilitating rapid and accurate formation of said matrix.

7. A method for protecting an astronaut and predetermined parts of the astronaut from excessive exposure to radiation in space, which comprises:

housing and regularly shielding the astronaut in a spacecraft structure including internal structural elements which are normally integral with said structure and can be used as shielding;

determining any development of excessive environmental radiation intensity from a radiation sensing device for indicating development of excessive radiation intensity in said spacecraft structure; and removing selected ones of said elements from said structure on such determination and forming in accordance with the indication of said sensing device, a matrix wherein the selected ones of said elements are positioned in proximity to at least the predetermined parts of the astronaut in an adequate amount and thickness to protect the same from deleterious effects caused by excessive exposure to radiation.

8. The invention as defined in claim 7 in which indicia means is provided for at least certain of the selected ones of said elements, and including relating said elements provided with said indicia means to the predetermined parts of the astronaut in a manner based upon the radiation intensity indicated by said sensing device for facilitating rapid and accurate formation of said matrix.

9. The invention as defined in claim 7 including positioning and securing in said matrix, the selected ones of said elements in proximity to the predetermined parts of the astronaut normally for a limited time in positioning and securing means to form said matrix.

10. The invention as defined in claim 9 in which said positioning and securing means includes a garment adapted to fit at least a certain portion of the astronaut, and having a plurality of pockets at various areas thereof for receiving and securing the selected ones of said elements to certain positions of said garment.

11. The invention as defined in claim 10 in which indicia means is provided for at least certain of the selected ones of said elements and corresponding indicia means is provided for certain pockets of said garment, and including relating the certain selected ones of said elements readily thereby to said pockets provided with corresponding indicia means for facilitating rapid and accurate formation of said matrix.

12. A method for protecting an astronaut and predetermined parts of the astronaut from excessive exposure to radiation, which comprises:

housing and regularly shielding the astronaut in a spacecraft structure including structural members having removable elements normally forming an integral part of each of said structural members and adapted to be usable as shielding;

determining any development of excessive environmental radiation intensity from a radiation sensing device for indicating excessive radiation intensity in said spacecraft structure;

removing selected ones of said elements from said structural members on such determination for use during a period of emergency due to development in said spacecraft structure of uncontrolled radiation of extreme intensity; and positioning and securing the selected ones of said elements according to the indication of said sensing device, in proximity to at least the predetermined parts of the astronaut for use during said period whereby a large amount of shielding material can be obtained and positioned about at least the vital parts of the astronaut during said period of emergency.

13. The invention as defined in claim 1 in which at least certain of the selected ones of said elements are fabricated of highly radiation resistant shielding material and are normally arranged in another matrix on said structure wherein said elements fabricated of highly radiation resistant shielding material are disposed to obstruct a significant portion of penetrating radiation impinging upon said structure.

14. The invention as defined in claim 7 in which at least certain of the selected ones of said internal structural elements are fabricated of highly radiation resistant shielding material and are normally arranged in another matrix on said structure wherein said elements fabricated of highly radiation resistant shielding material are disposed to obstruct a significant portion of penetrating radation impinging upon said structure.

15. The invention as defined in claim 12 in which said structural members are internal members having preshaped removable elements that are readily detachable from said structural members.

16. The invention as defined in claim 15 in which at least certain of the selected ones of said elements are fabricated of highly radiation resistant shielding material and indicia means is provided on said elements that are fabricated of highly radiation resistant shielding material, and including relating said elements provided with said indicia means readily thereby to certain corresponding vital parts of the astronaut in a manner based upon the radiation intensity indicated by said sensing device for facilitating rapid and accurate determination of the proper positioning and securing of such elements to the corresponding vital parts of the astronaut.

(References on following page)

References Cited

UNITED STATES PATENTS

| | | | |
|---|---|---|---|
| 2,857,525 | 7/1955 | Ferdon | 250—108 |
| 2,932,745 | 4/1960 | Alberti et al. | 250—108 |
| 3,065,351 | 11/1962 | Weinberger et al. | 250—108 |
| 3,113,089 | 12/1963 | Nagey et al. | 250—108 |
| 3,121,794 | 2/1964 | Held et al. | 250—108 |
| 3,256,440 | 6/1966 | Stark | 250—108 |
| 3,310,053 | 3/1967 | Greenwood. | |

OTHER REFERENCES

Madey, R.: Shielding Against Space Radiation; from Nucleonics, May 1963, pp. 56–60.

ARCHIE R. BORCHELT, Primary Examiner

U.S. Cl. X.R.

2—2